(12) United States Patent
Sung et al.

(10) Patent No.: US 10,463,956 B2
(45) Date of Patent: Nov. 5, 2019

(54) DEVICE FOR TRANSMITTING GAME APPLICATION PROGRAM AND RESOURCE FILE BETWEEN SMART DEVICES, APPLICATION PROGRAM, AND TRANSMISSION METHOD THEREFOR

(71) Applicant: Netmarble Corporation, Seoul (KR)

(72) Inventors: Un Jae Sung, Seoul (KR); Yun Jin Lee, Seoul (KR)

(73) Assignee: Netmarble Corporation, Seoul (KR)

( * ) Notice: Subject to any disclaimer, the term of this patent is extended or adjusted under 35 U.S.C. 154(b) by 0 days.

(21) Appl. No.: 16/090,118

(22) PCT Filed: Mar. 14, 2017

(86) PCT No.: PCT/KR2017/002723
§ 371 (c)(1),
(2) Date: Sep. 28, 2018

(87) PCT Pub. No.: WO2017/171270
PCT Pub. Date: Oct. 5, 2017

(65) Prior Publication Data
US 2019/0111340 A1    Apr. 18, 2019

(30) Foreign Application Priority Data

Mar. 29, 2016    (KR) ........................ 10-2016-0037861

(51) Int. Cl.
*A63F 13/30*    (2014.01)
*A63F 13/332*    (2014.01)
(Continued)

(52) U.S. Cl.
CPC ............ *A63F 13/332* (2014.09); *A63F 13/34* (2014.09); *A63F 13/35* (2014.09); *A63F 2300/406* (2013.01); *A63F 2300/408* (2013.01)

(58) Field of Classification Search
CPC ........ A63F 13/31; A63F 13/34; A63F 13/332; A63F 2300/402–406; A63F 2300/408; A63F 2300/572; A63F 2300/1031
See application file for complete search history.

(56) References Cited

U.S. PATENT DOCUMENTS

2011/0143661 A1\* 6/2011 Hartwig .................... G06F 8/65
455/41.1
2014/0256250 A1\* 9/2014 Cueto .................. H04B 5/0031
455/41.1

FOREIGN PATENT DOCUMENTS

JP    2007-236750 A    9/2007
JP    2011205183 A    10/2011
(Continued)

*Primary Examiner* — Omkar A Deodhar
(74) *Attorney, Agent, or Firm* — Kenneth E. Horton; Kirton McConkie

(57) ABSTRACT

A device for transmitting game data files between a plurality of smart devices through a short-range wireless communication network can be provided. The device comprises: a transmission and reception unit provided and operated in a smart device of a first user, transmitting a request for stored information of the game data files from the smart device of the first user to a smart device of a second user, and receiving the stored information from the smart device of the second user in response to the request for the stored information; and a processor for selecting at least one of the game data files to be received from the smart device of the second user, according to the stored information, and controlling the transmission and reception unit such that the transmission and reception unit receives the selected at least one game data file, wherein the game data file includes an executable file and at least one of resource files, the executable file is mapped to the at least one resource file according to a game scenario, the stored information includes a list of the game data files installed in the smart device of the second user, and (Continued)

the processor selects the at least one game data file by comparing the stored information with an executable file and/or a resource file installed in the smart device of the first user.

20 Claims, 11 Drawing Sheets

(51) Int. Cl.
*A63F 13/34* (2014.01)
*A63F 13/35* (2014.01)

(56) References Cited

FOREIGN PATENT DOCUMENTS

| | | | |
|---|---|---|---|
| KR | 10-2006-0008067 A | 1/2006 |
| KR | 10-2007-0095530 A | 10/2007 |
| KR | 10-2014-0099067 A | 8/2014 |

* cited by examiner

FIG. 4

| Bundle key | Content | Preceding bundle | | | | | Preceding executable file |
|---|---|---|---|---|---|---|---|
| Minimal | Data for initial game execution | X | ... | ... | ... | ... | 1 |
| Essential | Data for initial game execution | X | ... | ... | ... | ... | 1 |
| CreateAccount | Data for initial game execution | X | ... | ... | ... | ... | 1 |
| Tutorial | Data for tutorial execution | X | ... | ... | ... | ... | 1 |
| Story1 | Data for play of Story 1 | Tutorial | ... | ... | ... | ... | 1 |
| Story2 | Data for play of Stories 2 to 5 | Tutorial | ... | ... | ... | ... | 1 |
| Story3 | Data for play of Stories 6 to 10 | Tutorial | ... | ... | ... | ... | 1 |
| Story4 | Data for play of Stories 10 to 15 | Tutorial | ... | ... | ... | ... | 1 |
| Story5 | Data for play of Stories 16 to 20 | Tutorial | ... | ... | ... | ... | 1 |
| Guild | Data for play of guild war | AllGameCharacter | ... | ... | ... | ... | 2 |
| Raid | Raid | AllGameCharacter | ... | ... | ... | ... | 3 |

FIG. 5

| New user entry 510 | Before tutorial entry 520 | Current user entry 530 | Character purchase 540 |
|---|---|---|---|
| Essential | InGame0000000 | Essential | CreateAccount |
| CreateAccount | | | |
| Tutorial | | | |
| Stories 2~7 | Stories 8~12 | Stories 13~17 | Stories 18~22 |
| Story1 | Story2 | Story3 | Story4 |
| InGame0000000 | InGame0000000 | InGame0000000 | InGame0000000 |
| Stories 23~27 | Adventures 1,6,11 | Adventures 2,7,12 | Adventures 3,8,13 |
| Story5 | Adventure1 | Adventure2 | Adventure3 |
| InGame0000000 | InGame0000000 | InGame0000000 | InGame0000000 |
| Adventures 4,9,14 | Adventures 5,10,15 | Daily dungeon (Mon) | Daily dungeon (Tue) |
| Adventure4 | Adventure5 | DailyAct1 | DailyAct2 |
| InGame0000000 | InGame0000000 | InGame0000000 | InGame0000000 |
| Daily dungeon (Wed) | Daily dungeon (Thu) | Daily dungeon (Fri) | Daily dungeon (Sat) |
| DailyAct3 | DailyAct4 | DailyAct5 | DailyAct6 |
| InGame0000000 | InGame0000000 | InGame0000000 | InGame0000000 |
| Daily dungeon (Sun) | Raid | Battle field ~550 | Guild war ~560 |
| DailyAct7 | Raid | PVP | Guild |
| InGame0000000 | AllGameCharacter | AllGameCharacter | AllGameCharacter |

570

DEVICE FOR TRANSMITTING GAME APPLICATION PROGRAM AND RESOURCE FILE BETWEEN SMART DEVICES, APPLICATION PROGRAM, AND TRANSMISSION METHOD THEREFOR

TECHNICAL FIELD

Embodiments relate to a device and method for transmitting game data files between smart devices. More particularly, the embodiments relate to technology for transmitting game data files between smart devices of users using a short-range communication network without connecting to the Internet.

BACKGROUND ART

Today, with the development of communication networks using the Internet, various smart devices such as smart phones or tablet PCs are widely used.

Accordingly, a user of a smart device downloads and installs diverse application programs purchased through online content markets such as Apple App Store and Google Store on the smart device of the user through Internet communication networks and uses the application programs.

Typical Internet online games continuously supplement and upgrade game content since the games were initially distributed to users. For this, game developers continuously develop executable files and resource files of a version succeeding an initially distributed version and distribute the files to users through a content delivery network (CDN). The users may download, install and run the files of the succeeding version on own smart devices, thereby enjoying upgraded game content. Such game content may be used on the premise that support with respect to data communication costs or a stable infrastructure of a communication network is to be provided. Extremely large sizes of executable files and resource files of such online games may cause great data traffic. In an environment with a poor communication infrastructure, a user may not fully enjoy upgraded game content. That is, there may be no problem in an environment where a low-cost and high-efficiency communication infrastructure is established well, whereas suitable content may not be provided to a user in an environment where there exist a download fault and a high-cost and low-efficiency issue.

As described above, in a region in which a hurdle exists with respect to downloading or an excessive data charge is charged since a wired and wireless communication environment is not established well, there is a need for a method of installing or running an application program without using a data communication network by directly receiving or providing an executable file or a resource file of the application from or to a user at a short distance without using an Internet communication network. In this example, it may be best to transmit/receive an application program of a latest version between users, or otherwise, the user may need to selectively receive a resource file or an executable file within a range desired by the user, and technology for running a game selectively within the range of reception in an operation of the game application may be needed.

In addition, in an example in which the user desires to play content of a new story while the game is played, a capacity of a smart device of the user may be insufficient for downloading the content. In this example, there is a demand for technology for informing the user of the insufficient capacity such that the user may recognize the insufficient capacity and selectively download a resource file or an executable file with respect to content suitable for the smart device of the user.

DISCLOSURE OF INVENTION

Technical Goals

An aspect provides technology that may enable smart devices of users to transmit and receive game data files using a short-range wireless communication network, without using the Internet.

An aspect provides technology that may overcome a constraint in downloading game data files in relation to data communication costs or infrastructure stability issues.

An aspect provides technology that may enable a user to check game data files stored in a smart device of another user and selectively receive only a desired game data file within a range to execute and play a game in a version of an executable file installed on a smart device of the user or receive a game data file within a desired range and play the game even though the game data file is not of a latest version.

An aspect provides technology that may suggest game data which a user may additionally download from others in a version of an executable file in the user's possession through mapping a version of a game executable file and a game resource file required in the corresponding version and actively receive files based on the game data.

Technical Solutions

According to an aspect of the present invention, there is provided a device for transmitting game data files between a plurality of smart devices through a short-range wireless communication network, the device including a transceiver provided and operated in a smart device of a first user, the transceiver configured to transmit a request for stored information of the game data files from the smart device of the first user to a smart device of a second user and receive the stored information from the smart device of the second user in response to the request for the stored information, and a processor configured to select one or more game data files to be received from the smart device of the second user based on the stored information and control the transceiver to receive the selected one or more game data files, wherein the game data files may include an executable file and at least one of one or more resource files, the executable file may be mapped to the at least one resource file according to a game scenario, and the stored information may include a list of the game data files installed in the smart device of the second user, wherein the processor may be configured to select the at least one game data file by comparing the stored information with an executable file or at least one of resource files installed in the smart device of the first user.

According to an aspect of the present invention, there is provided an application program for transmitting game data files between a plurality of smart devices through a short-range wireless communication network, wherein the application program may be stored in a memory of a smart device of a first user, executed by a processor of the smart device of the first user, and configured to perform transmitting a request for stored information of the game data files from the smart device of the first user to a smart device of a second user and receiving the stored information from the smart device of the second user in response to the request for the stored information, selecting one or more game data files to be received from the smart device of the second user based on the stored information, displaying the stored information and a result of the selecting on a display of the smart device of the first user, and receiving the selected one or more game data files based on the result of the selecting, wherein the game data files may include an executable file and at least one of one or more resource files, the executable file may be mapped to the at least one resource file according to a game scenario, and the stored information may include a list of the game data files installed in the smart device of the second user.

According to an aspect of the present invention, there is provided a method of transmitting game data files from a smart device of a second user to a smart device of a first user through a short-range wireless communication network, the method including transmitting a request for stored information of the game data files from the smart device of the first user to the smart device of the second user, receiving the stored information from the smart device of the second user in response to the request for the stored information, and selecting one or more game data files to be received from the smart device of the second user based on the stored information and receiving the selected one or more game data files, wherein the game data files may include an executable file and at least one of one or more resource files, the executable file may be mapped to the at least one resource file according to a game scenario, and the stored information may include a list of the game data files installed in the smart device of the second user.

Effects

According to an embodiment, it is possible to reduce a data charge by transmitting game resource files using a short-range communication network such as a wireless access point or wireless-fidelity (Wi-Fi) Direct, without connecting to the Internet.

According to an embodiment, it is possible to promote a user convenience by transmitting game data files conveniently using an application program between users.

According to an embodiment, a smart device of a first user may receive information related to a latest resource file from a game server and select a resource file to be exchanged with a smart device of a second user.

According to an embodiment, it is possible to transmit and receive a resource file stored in a smart device at a fast rate through a short-range communication network.

According to an embodiment, it is possible to supplement problematic elements such as a data communication charge, an Internet communication network environment, and a device capacity in providing a game application program.

BRIEF DESCRIPTION OF DRAWINGS

FIG. 4 is a table illustrating an example of mapping resource files and executable files according to an embodiment.

FIG. 5 is a table to describe resource files required to execute a game scenario according to an embodiment.

BEST MODE FOR CARRYING OUT THE INVENTION

Figure 1A:
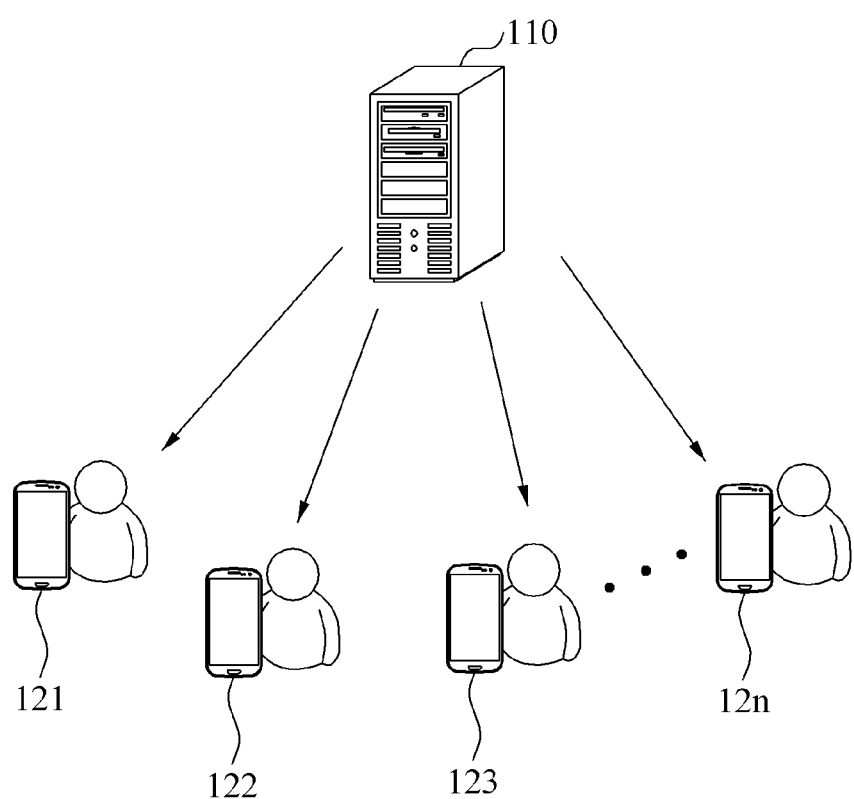
FIGS. 1A and 1B illustrate examples of receiving a game installation executable file.

The following structural or functional descriptions are exemplary to merely describe the embodiments, and the scope of the embodiments is not limited to the descriptions provided in the present specification. Various changes and modifications can be made thereto by those of ordinary skill in the art.

Although terms of first or second are used to explain various components, the components are not limited to the terms. These terms should be used only to distinguish one component from another component. For example, a first component may be referred to as a second component, or similarly, and the second component may be referred to as the first component within the scope of the right according to the concept of the present disclosure.

It should be noted that if it is described that one component is "connected", "coupled", or "joined" to another component, a third component may be "connected", "coupled", and "joined" between the first and second components, although the first component may be directly connected, coupled, or joined to the second component.

The singular forms are intended to include the plural forms as well, unless the context clearly indicates otherwise. It should be further understood that the terms "comprise" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein. Hereinafter, the embodiments will be described in detail with reference to the accompanying drawings, wherein like drawing reference numerals are used for like elements.

Today, game data files associated with a program of an online game broadly include an executable file and resource files. The "executable file" refers to a file to be used to install an application program of an online game on a smart device or computer of a user, and the "resource files" refer to game data files required to execute the application program, for example, a graphic icon, an image, a video, a background, a sound, a table, and a text.

Figure 1B:
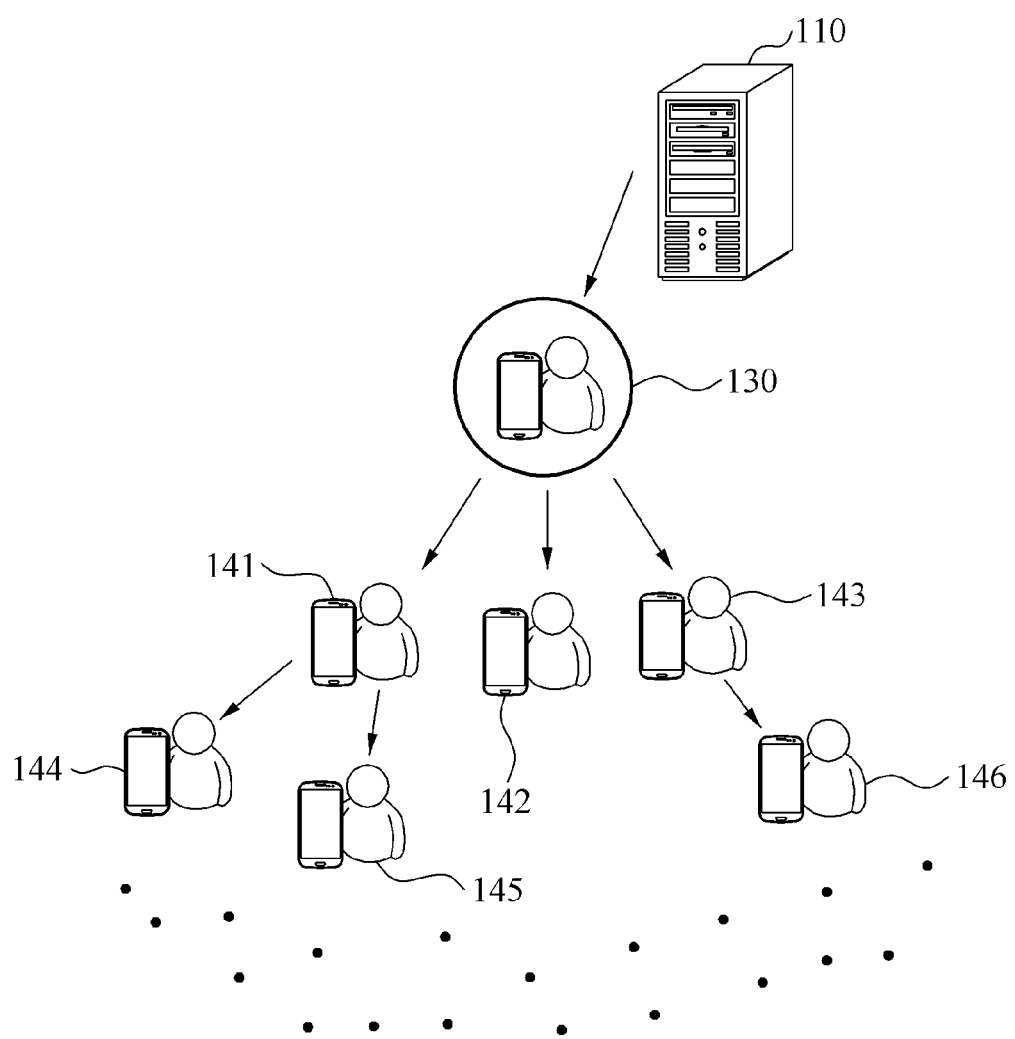

FIGS. 1A and 1B illustrate examples of receiving an executable file.

FIG. 1A illustrates an example of receiving an executable file from an online market server according to an existing scheme.

The term "online market" used herein is a store on the Internet where mobile application programs are on sale and collectively refers to Google Play for an Android platform or App Store for an iOS platform. Users 121, 122, 123, ... , 12n may separately receive an executable file from an online market server 110 through smart devices and not share the executable file with each other.

An example of the executable file is a software build which collectively refers to a process of converting source code files into standalone software artifacts that may be be run on a computer or a result of doing so. A user may download a software build for a game to play using a smart device of the user and execute the software build on the smart device. The executable file may include a file with a .apk or ipa extension.

For example, the Android application package (APK) is a package file format used for distribution of Android software and middleware and has a ".apk" extension. To make an APK file, a program for Android is first compiled, and then all files are packaged into one package file. An APK file contains all codes of the corresponding program, resources, information, certificates, and manifest files.

As another example, a .ipa file is an iOS application program archive file which stores an iOS app. Each .ipa file includes a binary for the ARM architecture and may only be installed on an iOS device. A game developer registers a new executable file for Android or iOS (.apk or .ipa file) or an executable file of a new version with the online market server to provide the executable files to users. In this example, a version of the build may be registered together. The online market server may check the version and provide a notification to a user to update a game data file in an example in which a version of the game data file of the user differs from the latest version. Smart devices of the users 121, 122, 123, ... , 12n may download an executable file and resource files required for initial execution from the online market server 110, and the online market server 110 and the smart devices of the users 121, 122, 123, ... , 12n may be connected via wireless Internet or wireless-fidelity (Wi-Fi) through a wireless access point or paid network.

FIG. 1B illustrates an example of downloading initial game installation files from an online market server as in an existing scheme and sharing a game installation executable file between users using a patent technology according to an embodiment. A smart device of a user 130 may primarily receive an executable file from the online market server 110 or an external game server and transmit the received files to other users 144, 145 and 146. Thus, the users 141, 142 and 143 may not necessarily need to receive the executable file from the online market server 110 and may download the executable file between the users and install and execute a game. To exchange the game executable file between the user 130 and the other users 141, 142 and 143 through their respective smart devices, the user 130 and the other users 141, 142 and 143 may be connected to each other using a short-range communication network such as a wireless access point or Wi-Fi Direct. As shown in FIG. 1B, the users 141, 142 and 143 may transmit the game data file to an infinite number of users including users 144, 145 and 146.

As a result, users at a short distance and with smart devices on which an application of the patent technology is installed may exchange game data files with each other through a short-range communication network dynamically at a desired time as shown in FIG. 1B, whereby a device according to an embodiment may be utilized usefully in a region in which a wires communication network has not been developed or a region in which an excessive data charging is likely to incur. Here, Wi-Fi Direct is a method of wirelessly quickly transmitting a large volume of data between smart phones/tablet PCs and enables data communication only between devices supporting Wi-Fi Direct. Wi-Fi Direct has a maximum transmission rate of about 250 megabits per second (Mbps) and a transmission range of 200 meters (m) or less and thus, enables a relatively efficient transmission when compared to Bluetooth merely having a maximum transmission rate of 24 Mbps and a transmission range of 10 m. When connecting to a wireless communication network, the users may transmit resource files between the smart devices by controlling the smart devices. Here, the smart devices collectively refer to products that may have unlimited functions and change or extend a considerable portion of the functions through application programs, and smart phones and tablets are widely used these days as examples of the smart devices. The game data files used herein refer to game software associated with a computer system and include a program, a utility, or minor components in the program.

Figure 2A:
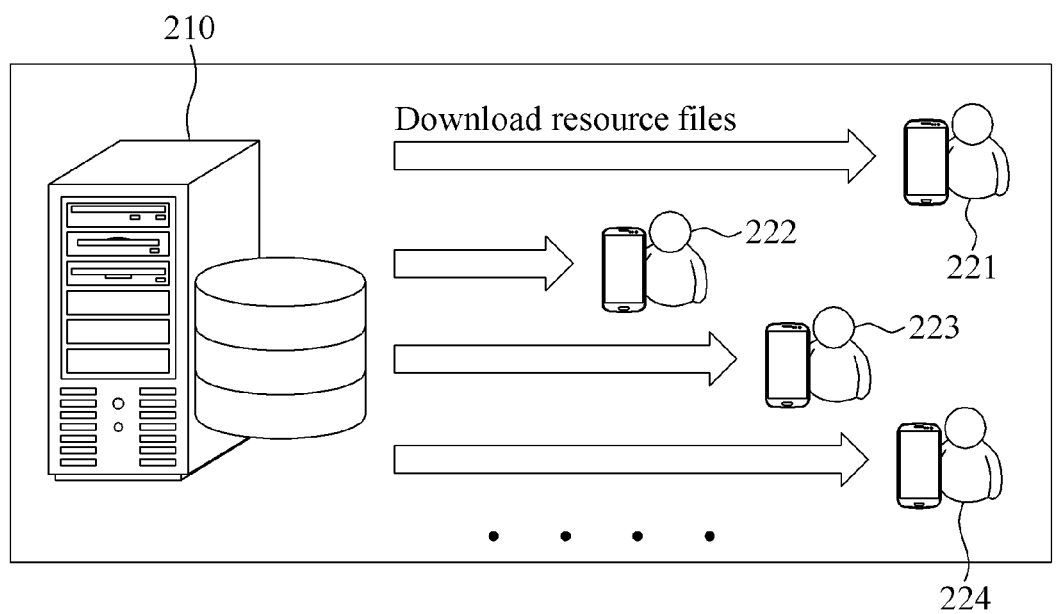
FIGS. 2A and 2B illustrate examples of receiving additional resource files required for playing a game.

FIG. 2A illustrates an example of downloading resource files according to a related art. Users 221, 222, 223 and 224 may receive resource files from a content delivery network (CDN) server 210 using smart devices. In this example, resource file sharing between the users may not be performed, and transmission of the resource files may be performed only through a CDN. The CDN collectively refers to a system that stores data in a distributed server to deliver data files such as game data files to smart devices of users in an Internet use environment. Since an executable file and resource files to be provided by a game developer using an online market server have determined sizes, the resource files may be distributed and stored for each Internet service provider network by installing a cache server on the Internet service provider network and transmitted immediately from an Internet service provider network connecting to an Internet line of a user at a request of the user.

Figure 2B:
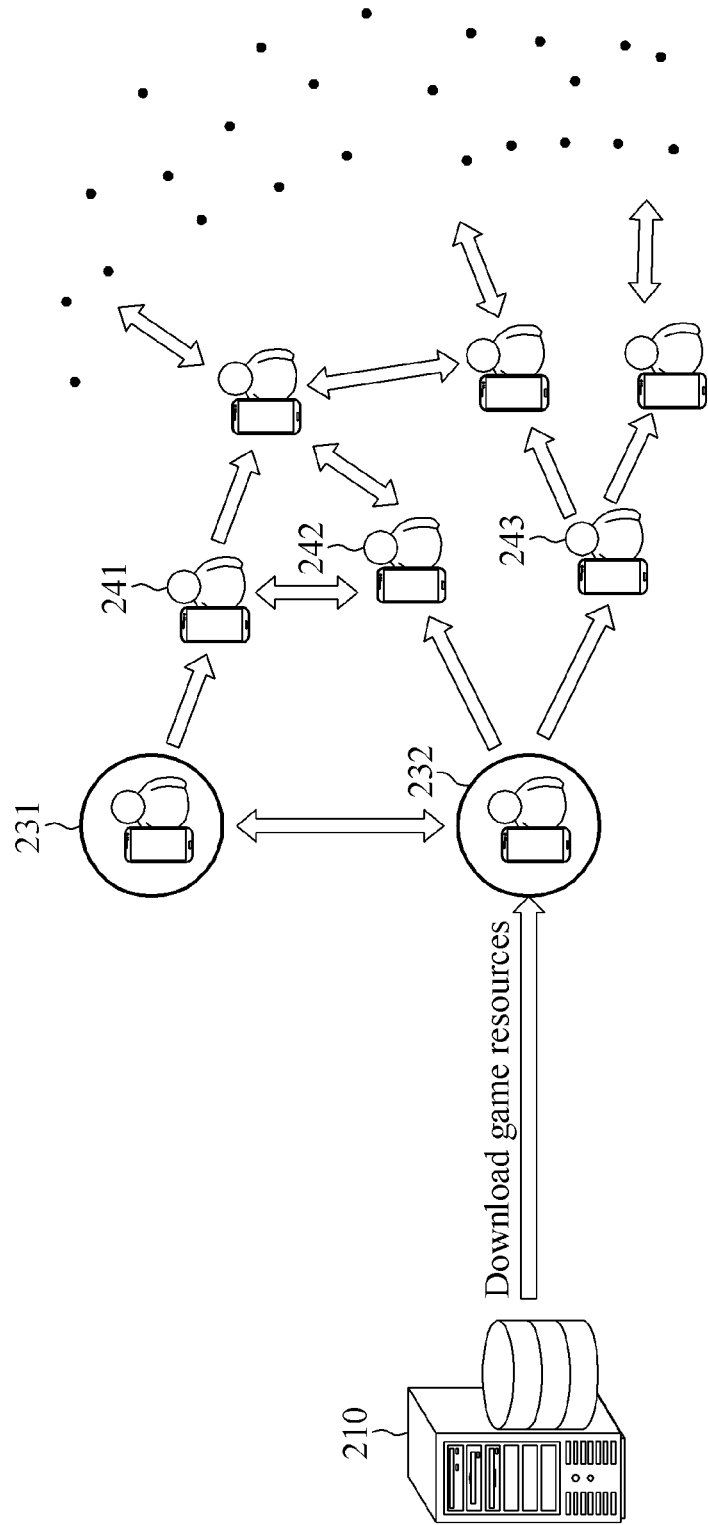

FIG. 2B illustrates a resource file transmitting scheme according to an embodiment. Unlike the existing transmission scheme, a user 232 may primarily receive resource files through the CDN server 210, and users 231, 241, 242 and 243 may not necessarily need to receive the resource files through the CDN server 210 and may receive the resource files from each other through a short-range wireless communication network. As indicated using arrows, smart devices of the users may compare resource files currently in possession, verify information related to the respective resource files, and actively share resource files needed by each other. In detail, the information related to the respective resource files may be exchanged first, and necessary resource files may be selectively shared by determining receivable resources or resources requiring version updates. A detailed description of a communication method between smart devices of users is as described above with reference to FIG. 1, and a scheme of comparing the resource files and an example of receiving necessary resource files will be described in detail with reference to FIG. 3 and the following drawings.

Figure 3:
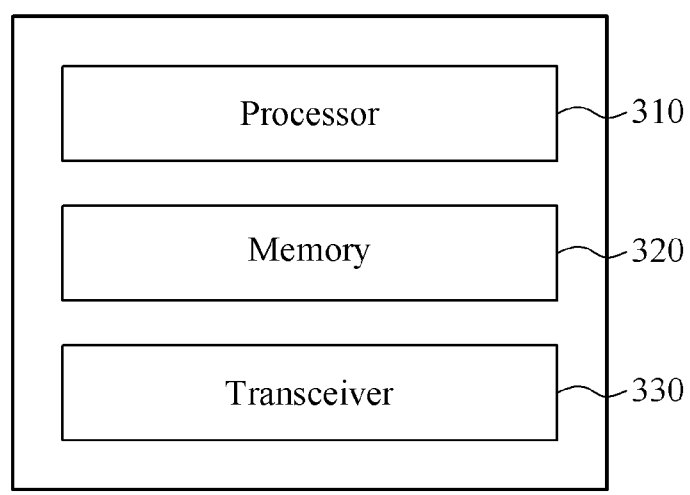
FIG. 3 is a block diagram illustrating an internal configuration of a game data file transmitting device according to an embodiment.

FIG. 3 is a block diagram illustrating an internal configuration of a game data file transmitting device according to an embodiment.

A device 300 for transmitting game data files between a plurality of smart devices through a short-range wireless communication network, provided according to an embodiment, may include a processor 310, a memory 320 and a transceiver 330. The game data file transmitting device 300 may be configured using a processor, a transceiver and a memory provided in a smart device and operate as a part of the smart device, or otherwise implemented to operate as a device separate from the smart device. Further, the device may operate to transmit and receive game data files between users on a portion of a game application program and help with transmission and reception of game data files between users on a separate application program downloaded from a market.

The device may be executed on all smart devices of a first user and a second user and fluidly exchange game data files and information related to the game data files between devices. The two smart devices may sense each other and sense a service to provide the corresponding technology. Hereinafter, an example in which transmitter/receiver are determined will be described. However, the transmitter/receiver may be fluidly changed depending on an implementation method, which may also apply to a game data file transmitting method and a game data file transmitting application program which will be described later.

The transceiver 330 may transmit a request for stored information of the game data files from the smart device of the first user to the smart device of the second user. The smart device of the first user desiring to receive the game data files may sense the smart device of the second user from which the game data files are to be received through the device, search for and sense a service to which the corresponding patent technology is applied, and request the stored information of the game data files. The stored information may include a list and information of the game data files installed on the smart device of the second user, and the smart device of the second user to transmit the game data files may generate the list of the game data files in possession and transmit the generated list to the smart device of the first user. For example, the list may include information related to the game data files, and the information may include a variety of information such as matchings between each resource file and an executable file version in which the corresponding resource file may be executed, a name of a resource bundle corresponding to a bundle of resource files, names of the resource files with respect to the resource bundle, and sizes of the respective resource files. The list may be provided to a user such that the user may select and receive a game data file.

When the smart device of the second user transmits the list of the game data files to the smart device of the first user in response to the request for the stored information, the transceiver 330 may receive the stored information from the smart device of the second user in response to the request for the stored information. When the stored information is received, the processor 310 may select one or more game data files to be received from the smart device of the second user based on the stored information and control the transceiver to receive the selected one or more game data files.

First, versions of executable files may be compared. If the executable file of the smart device of the second user is of a more recent version, resource files including the executable file may be selected and received, and the smart device of the first user may update the executable file using the received game data files and perform installation and version update of the resource files. If the game application is not implemented, an executable file of a higher version may not be transmitted to the smart device of the first user. When the user desires not to update the executable file, only resource files executable in a version of the executable file installed on the smart device of the first user may be selected and a list thereof may be generated and shown to the user such that the first user may selectively receive the resource files. In this example, the user may be informed of information related to receivable resources files or a range of the game that may be played additionally when the user updates the executable file. Here, the versions of the executable files and the configurations and versions of the resource files may be compared. In response to determination that there is no file to receive from the smart device of the second user, the game data files may not be received. In this example, conversely, whether there is a game data file to be transmitted from the first user to the second user may be determined, and the game data file may be transmitted to the smart device of the second user as in the process described above. The game data files may include an executable file and at least one of one or more resource files. The executable file may be mapped to the at least one resource file. The processor 310 may select a resource file or executable file necessary for the game application program of the smart device of the first user and control the transceiver 330 to receive only the executable file or to receive one or more resource files mapped to the executable file together. As described above, the game data file transmitting device may distinguish an executable file and resource files stored in a smart device of another user and change a scheme of receiving game data files based on stored information thereof.

For example, at least one resource file may be mapped to at least one version of a single executable file. The executable file is a game application program installed on a smart device of a user, and there may exist a resource file required according to a predetermined scenario with respect to a version of the corresponding executable file. For each scenario, a version of the executable file requiring the corresponding resource file and the corresponding resource file may be mapped. That is, at least one resource file may be mapped to a plurality of executable files of different versions or mapped to a plurality of versions with respect to a single executable file as another concept.

FIG. 4 is a table illustrating an example of mapping resource files and executable files according to an embodiment.

One or more resource files may be bound and classified as a resource file bundle. To identify a plurality of resource file bundles generated in this way, an identifier may be assigned to each resource file bundle, and the identifier may be referred to as a bundle key 410. Further, in an example in which respective resource file bundles are to be installed and executed on the smart device of the first user, there may be a bundle of resource files that needs to be installed precedingly before the respective resource file bundles are installed. Such a bundle of resource files will be referred to as a preceding bundle 430. Lastly, in an example in which a smart device of a user is to execute a resource file, there may be an executable file that needs to be installed before the execution. Such an executable file will be referred to as a preceding executable file 440. That is, although it is desired to receive a predetermined resource file from the smart device of the second user and execute the resource file, it may be impossible to play a game scenario with respect to the resource file if the smart device of the first user does not have an executable file of a version mapped to the predetermined resource file. Conversely, although the executable file is not the latest one, only a resource file executable within the version of the build in possession may be received, installed and executed. Referring to FIG. 4, if the smart device of the first user has an executable file of version 1, only scenarios corresponding to initial game execution, tutorial execution, and play of stories 1 to 15 may be executed, and content of a raid and a guild war play may not be executed without an executable file of version 2 or 3.

Versions of the executable files may be mapped to the one or more resource files according to a game scenario. Referring to FIG. 4, the bundle key 410, the preceding bundle 430, and the preceding executable file 440 may be mapped according to a game scenario 420. There may exist various examples of the game scenario 420, for example, a game story, an event in the game, and a function in the game. The game story may be interpreted as collectively referring to a series of processes occurring in response to an input of a user or through an interaction with the user after the user enters the game, and the game event may be interpreted as an event set by a game developer at each predetermined point of the game to promote an interest in the game. In the example of FIG. 4, according to "data for initial game execution" which is an example of the game story, it may be learned that resource files having bundle keys of Minimal, Essential, CreateAccount are mapped to the executable file of version 1. That is, the smart device of the user receiving the executable file at an early stage may be in possession of resource files corresponding to bundle keys of Minimal, Essential, CreateAccount, and Tutorial, and the user having the executable file of version 1 may receive resources files of up to the story 15 from a smart device of another user and play the game. Further, a user desiring to play guild war and raid scenarios which are examples of the game event may need to have an executable file of version 3 or higher and precedingly install a resource file corresponding to a bundle key of AllGameCharacter. However, a user not desiring to play the guild war or raid scenario may not need to receive the resource file corresponding to the bundle key of AllgameCharacter and may play the game only with the executable file of version 1 and the bundle key of Tutorial if the user desires to play the game up to the story 15.

As described above, the executable file or the version of the executable file may be mapped to at least one resource file according to at least one game scenario, and the user may select an executable file and a resource file to be received from the smart device of the second user based on the mapping information and receive the selected executable file and resource file. The processor may select the at least one game data file by comparing the stored information with store information of an executable file or at least one of resource files installed on the smart device of the first user.

The processor 310 may select the resource file stored in the smart device of the second user by comparing the stored information related to game data of the smart device of the second user with the resource files installed on the smart device of the first user, determine whether an executable file mapped to the selected resource file is stored in the smart device of the first user, and additionally select the executable file mapped to the selected resource file based on a result of the determining. In an example in which a preceding bundle and an executable file mapped to the resource file to be received are all installed, the processor 310 may select only the corresponding resource file and control the transceiver 330 to receive the resource file. Further, in response to determination that the preceding bundle or the executable file mapped to the corresponding resource file is not stored in the smart device of the first user, all the corresponding resource file, the executable file mapped to the resource file and the preceding bundle may be received from the smart device of the second user.

The processor 310 may compare the stored information with a version of the executable file installed on the smart device of the first user, request a game build of a higher version from the smart device of the second user if a game application version of the second user is a higher version, and additionally select the resource file mapped to the selected executable file. That is, conversely, in an example in which at least one resource file is to be received, an executable file of a version mapped to the corresponding resource file may be received together such that game scenarios playable with the corresponding executable file may be played together. In this example, there may be no need to unconditionally receive all the one or more resource files mapped to the version of the executable file. A resource file selected directly by the processor 310 or selected by the user may be selectively downloaded, whereby a user convenience may be promoted.

Further, although not shown in the drawings, a capacity required for installing each game scenario may be suggested. The processor 310 may control the transceiver 330 not to receive a resource file corresponding to a game scenario with a possibility of requiring an excessive amount of time for transmission or a game scenario which requires an excessive capacity and may not be installed any further in view of an available capacity of a smart device on which the device is installed.

FIG. 5 is a table to describe resource files required to execute a game scenario according to an embodiment.

A game scenario may be specified for each game story or game event. As described above, the game story collectively refers to a series of processes occurring after a user enters a game, and the game event collectively refers to an event occurring while the game is played. Referring to FIG. 5, as examples of the game story, there may be "new user entry 510", "before tutorial entry 520", "current user entry 530", and "stories 1 to 27" which happen in the game, and all of these examples may be interpreted as a series of processes of the game played over time after the user enters the game. As examples of the game event, "Character purchase 540", "adventure" and "daily dungeon" may correspond to game events specified based on predetermined events set by a game developer in the game, irrespective of a temporal progress of the game, and be combined into a game scenario.

As another example, referring to FIG. 5, information related to resource bundle keys necessary for game scenario execution is illustrated. A user may selectively receive at least one resource file corresponding to a game scenario associated with a game story or a predetermined event for each scenario and play the corresponding game scenario. The user may need to receive all resource files necessary for executing the corresponding scenario. In this example, the smart device of the first user may receive only resource files corresponding to a desired scenario through information of recourse files for each game scenario. For example, in an example in which a user desires to play up to the story 7 and "battle field 550", resource files included in bundle keys of "Story1" and "InGame0000000" corresponding to "stories 2 to 7 570" and resource files corresponding to bundle keys of "AllGameCharacter" and "PVP" included in a bundle key corresponding to "battle field 550" may be received to play the game scenario. As described above, when the game data file transmitting device provided as an example of the embodiment is used, only a game scenario of content desired by a user may be played by selectively receiving resource files from a smart device of another user after an executable file is installed.

Figure 6:
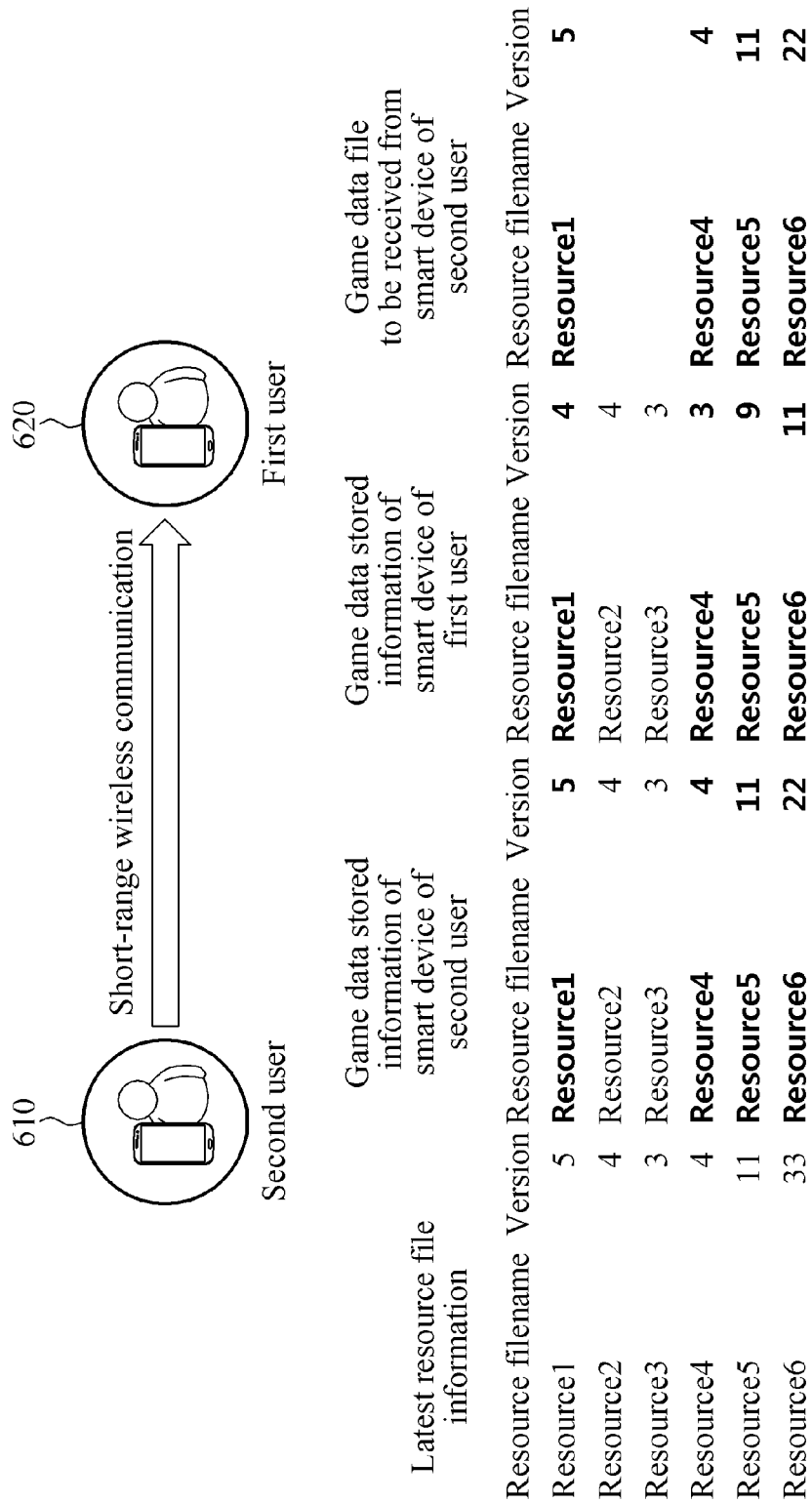
FIG. 6 illustrates an example of comparing resource file versions between users according to an embodiment.

FIG. 6 illustrates an example of comparing resource file versions between users according to an embodiment.

Referring to FIG. 6, resource files may be transmitted from a smart device of a second user 610 to a smart device of a first user 620, and the resource files may be exchanged using a short-range wireless communication network. Stored information received from the smart device of the second user may include version information of game data files, and the transceiver 330 may receive latest version information related to the game data files from a game server. The game server may be a CDN server from which the smart device of the user may receive an executable file or a resource file or a server run by a developer which separately supplies a game application program to the CDN server. The game server may typically store game data files of the latest versions to provide upgraded game content to users. Thus, version information related to the resource file of the latest version may be obtained through a connection to the game server, and a resource file may be appropriately selected and received from a smart device of another user by analyzing the version information. As described above, the stored information may include information related to the versions of the game data files and overall information related to the game data files, in addition to information simply indicating whether the game data files are stored in the smart device of the first and second users. The smart device of the first user 620 may receive latest version information related to the game data files from the game server, and the latest version information may be helpful to verify whether game data stored information of the smart device of the second user is latest information. Even after the game data files are received from the smart device of the second user, the latest version information may be utilized usefully to verify whether reception of an additional game data file is needed.

The processor 310 may compare the latest version information with version information included in the stored information and determine whether to receive the game data files based on a result of the comparing. Referring to FIG. 6, latest resource file version information related to Resources 1 to 6 and the stored information of the smart device of the second user may be compared, and it may be determined that the smart device of the second user has a latest version of resource files with respect to Resources 1 to 5. If the stored information with respect to the smart device of the second user is verified, the stored information may be compared again with the stored information of the smart device of the first user to select game data to be received. Referring to FIG. 6, it may be determined that the smart device of the second user is in possession of resource files of higher versions with respect to Resources 1, 4, 5 and 6, and thus Resource 1, 4, 5 and 6 may be determined to be the game data files to be received from the smart device of the second user.

In an example in which the versions of the game data files are lower than the version of the latest version information, the processor 310 may determine whether to receive the game data files in view of a game scenario determined based on the versions of the game data files. Referring to Resource 6 of FIG. 6, version 22 of Resource 6 of the smart device of the second user is higher than version 11 of Resource 6 stored in the smart device of the first user but not the latest version 33. In this example as well, if the first user desires to play up to a scenario corresponding to version 22 of Resource 6, whether to receive Resource 6 may be determined in view of a game scenario determined based on version 22 of the game data file Resource 6.

An application program for transmitting game data files between a plurality of smart devices through a short-range wireless communication network may be stored in a memory of the smart device of the first user and executed by a processor of the smart device of the first user. The application program may operate as a part of a game application program and be downloaded in a form of a separate application program from a market and operated by the smart device of the user.

The application program may perform an operation of transmitting a request for stored information of the game data files from the smart device of the first user to the smart device of the second user. The smart device of the first user desiring to receive the game data files may search for and sense the smart device of the second user from which the game data files are to be received through the device and request stored information of the game data files. The stored information may include a list of the game data files installed on the smart device of the second user, and the smart device of the second user to transmit the game data files may generate the list of the game data files and transmit the generated list to the smart device of the first user. The application program may perform an operation of receiving the stored information from the smart device of the second user in response to the request for the stored information. In this example, the game data files may include an executable file and at least one of one or more resource files.

The game data file transmitting application program may select one or more game data files to be received from the smart device of the second user based on the stored information. Further, the stored information and a result of the selecting may be displayed on a display of the smart device of the first user, and one or more data files may be received based on the result of the selecting. In this example, the game data files may include an executable file and at least one of one or more resource files, the executable file may be mapped to the at least one resource file according to a game scenario, and the stored information may include a list of the game data files installed on the smart device of the second user. Content of the list and an example of selecting game data files are the same as described with respect to the game data file transmitting device and thus, will be omitted for conciseness.

Figure 7A:
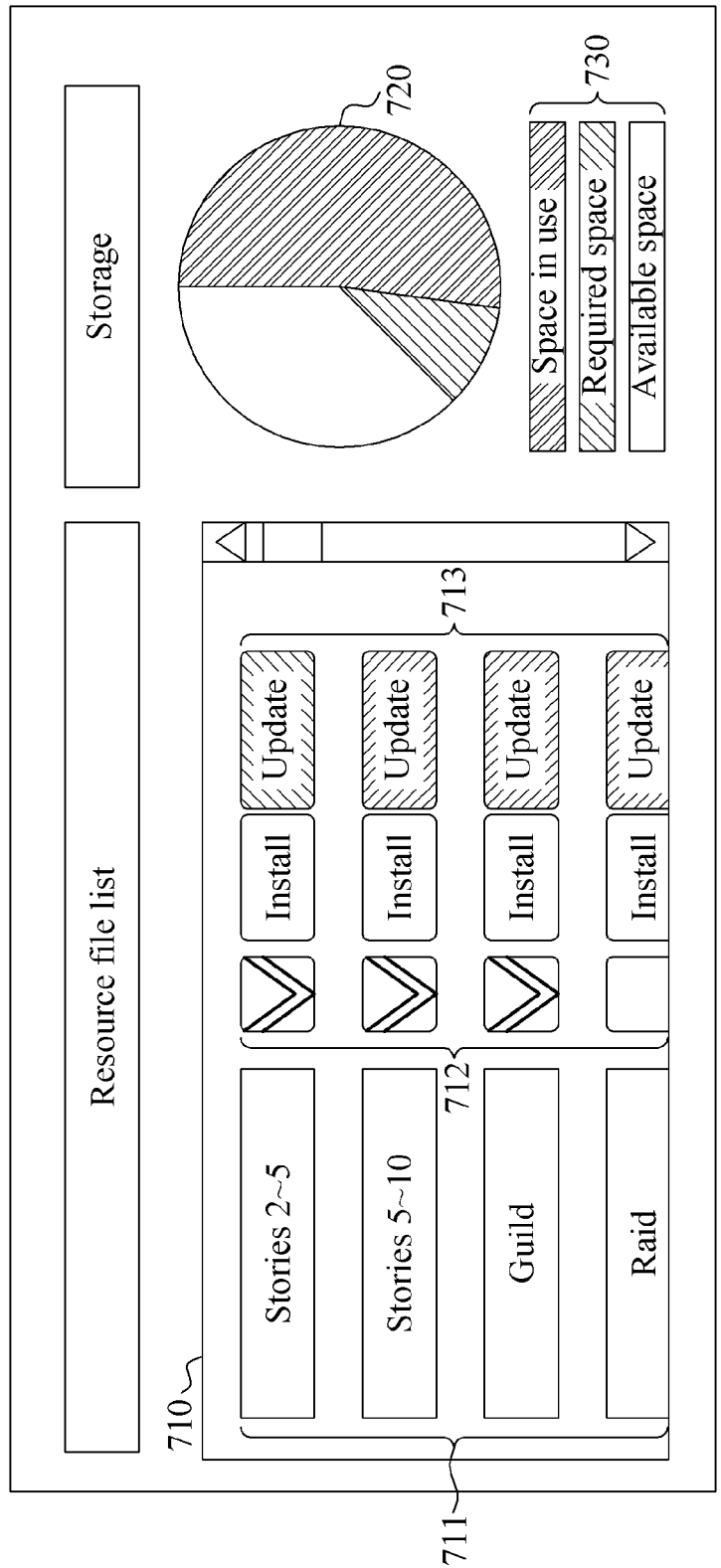
FIGS. 7A and 7B illustrate examples of displaying a list and information of game data files that may be received by a terminal of a user from a terminal of another user in a game data file transmitting application program according to an embodiment.
Figure 7B:
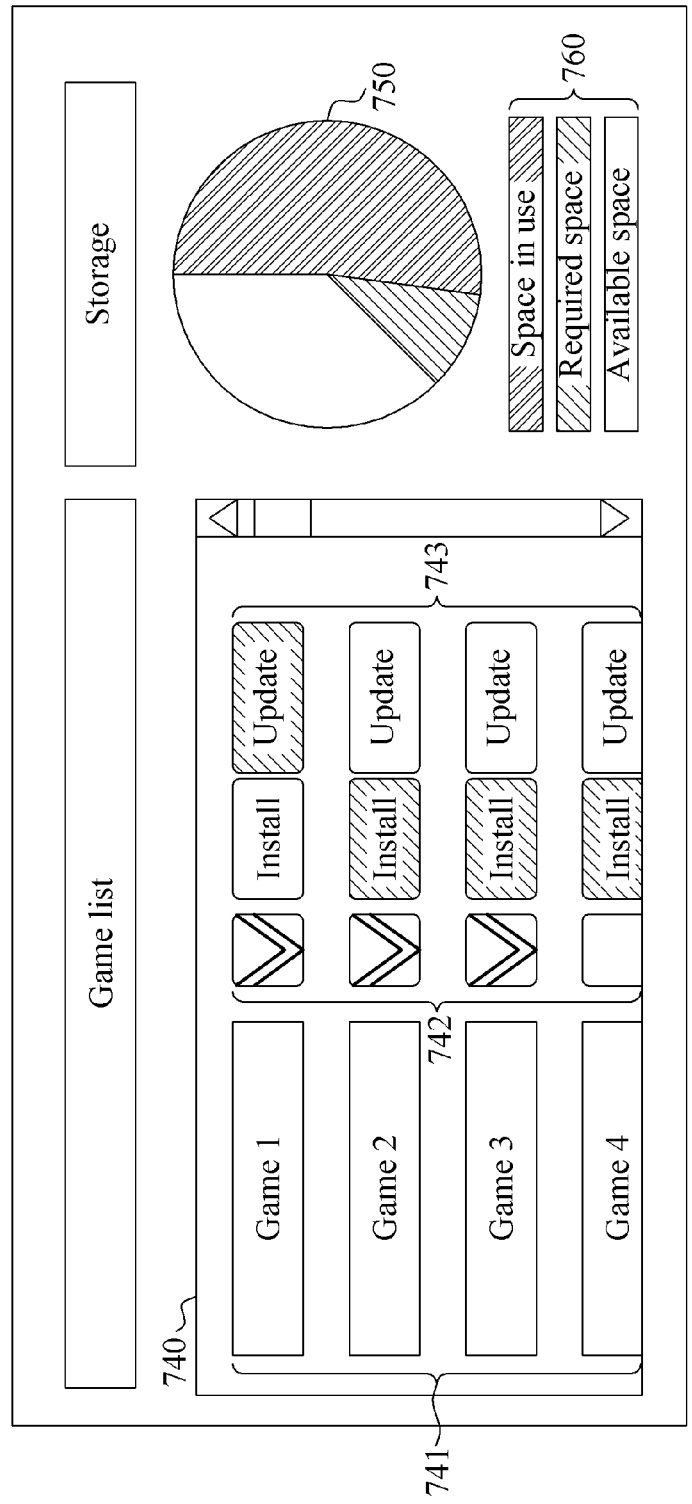

FIGS. 7A and 7B illustrate examples of displaying a list of game data files on a terminal of a user in a game data file transmitting application program according to an embodiment.

As described above, the application program may autonomously select a game data file to be received from a smart device of a second user and receive the game data file in response to the game data file being selected by the first user.

FIG. 7A illustrates an example of displaying a list of resource files on a terminal of a user. The application program may perform an operation of displaying stored information on a display of a smart device of a first user and receiving, from the smart device of the second user, game data files selected in response to an input from the user through the display of the smart device of the first user. Referring to FIG. 7, a region 710 may provide a list of resource files selectable by a user and show the user information of receivable resource files for each scenario. As described above, names 711 of scenarios of stories 2 to 5, stories 5 to 10, a guild, and a raid may be provided through the list. A resource file may be selected by checking a checkbox 712, and an installation or update of the corresponding resource file may be selected as shown in a region 713. In this example, if the corresponding resource file is yet to be installed, the corresponding resource file may be installed. If the corresponding resource file is already installed, an update may be performed.

FIG. 7B illustrates an example of displaying a list of game executable files on a terminal of a user. A region 740 may provide a list of executable files of games and a region 741 may provide names of the games. When the user is provided with the list of the games and information related to the games from a smart device of a second user, the user may select a game to be installed or updated as shown in a region 742. In this example, an "Update" button may be activated and provided to the user if an executable file of a game is already installed on the smart device of the user, and an "Install" button may be activated if the executable file of the game is yet to be installed on the smart device, as shown in a region 743. The user may select an executable file of a desired game to update the game or newly receive the executable file. In the example of FIG. 7B, an executable file of Game 1 may be already installed, and thus an "Update" button may be activated. Executable files of remaining Games 2, 3 and 4 may be yet to be installed, and thus "Install" buttons may be activated. Similar to the example of FIG. 7A, information 750 and 760 related to a currently available space of the device may be provided along with the list. In this example, the space (capacity) of the device is provided exemplarily, and a variety of information related to executable files may be provided.

An application program may perform an operation of displaying a list of at least one game data file to be received as being selected by the first user and game data file information on a display of the smart device of the first user, and an operation of outputting a storage space of the smart device of the first user through the display of the smart device of the first user in an example in which the game data file information is associated with a data size. If information related to resource files includes capacity information, that is, sizes of the game data files, a storage space 720 required for installing an additional resource file may be displayed in view of the storage space of the smart device of the first user. In this example, by separately displaying states of a space in use, a required space, and an available space as shown in a region 730, the user may understand better and easily select the resource file. The executable file may be mapped to the one or more resource files according to a game scenario. As described above, although it is desired to receive a specific resource file from the smart device of the second user, a game scenario with respect to the specific resource file may not be executed if the smart device of the first user does not have an executable file mapped to the specific resource file. Each executable file may be mapped to one or more resource files, and the at least one game data file may be selected by comparing the stored information with an executable file or at least one of the resource files installed on the smart device of the first user.

The operation of selecting may include an operation of selecting a resource file stored in the smart device of the second user by comparing the stored information related to the game data of the smart device of the second user with resource files installed on the smart device of the first user, and an operation of determining whether an executable file mapped to the selected resource file is stored in the smart device of the first user and additionally selecting the executable file mapped to the selected resource file based on a result of the determining.

In an example in which all of a preceding bundle and an executable file mapped to a resource file to be received are installed, the application program may select and receive only the corresponding resource file. Further, in response to determination that the preceding bundle or the executable file mapped to the corresponding resource file is not stored in the smart device of the first user, all of the preceding bundle and the executable file mapped to the corresponding resource file as well as the corresponding resource file may be received from the smart device of the second user.

The game data file transmitting application program may perform an operation of comparing the stored information with an executable file installed on the smart device of the first user, and an operation of selecting an executable file stored in the smart device of the second user and additionally selecting a resource file mapped to the selected executable file. That is, contrary to the above case, in an example in which it is desired to receive an executable file of a higher version, one or more resource files mapped to the corresponding executable file may also be received together such that game scenarios playable with the corresponding executable file may be played together. In this example, there may be no need to unconditionally receive all the one or more resource files mapped to the executable file. Selective downloading may be possible, and thus a user convenience may be promoted.

The application program may perform an operation of specifying the game scenario for each event or stage flow in the game being played. That is, the user may play the game by randomly or selectively receiving a resource file corresponding to a game scenario associated with a predetermined event or a game scenario provided for each stage as the game is played after the user enters the game. The smart device of the first user may receive only a resource file corresponding to a desired game scenario through the information for each game scenario.

The stored information received from the smart device of the second user may include version information of the game data files, and the application program may perform an operation of receiving latest version information related to the game data files from a game server. As described above, the stored information may include version information of the game data files and overall information related to the game data files, in addition to information simply indicating whether the game data files are stored in the smart device of the first and second users. The smart device of the first user may receive latest version information related to the game data files from the game server, and the latest version information may be helpful to verify whether game data stored information of the smart device of the second user is latest information. Even after the game data files are received from the smart device of the second user, the latest version information may be utilized usefully to verify whether reception of an additional game data file is needed.

The application program may perform an operation of comparing the latest version information with version information included in the stored information and determining whether to receive the game data files based on a result of the comparing. In an example in which the versions of the game data files are lower than the version of the latest version information, the application program may perform an operation of determining whether to receive the game data files in view of a game scenario determined based on the versions of the game data files. A further detailed description of the application program is the same as described with respect to the game data file transmitting device and thus, will be omitted for conciseness.

Figure 8:
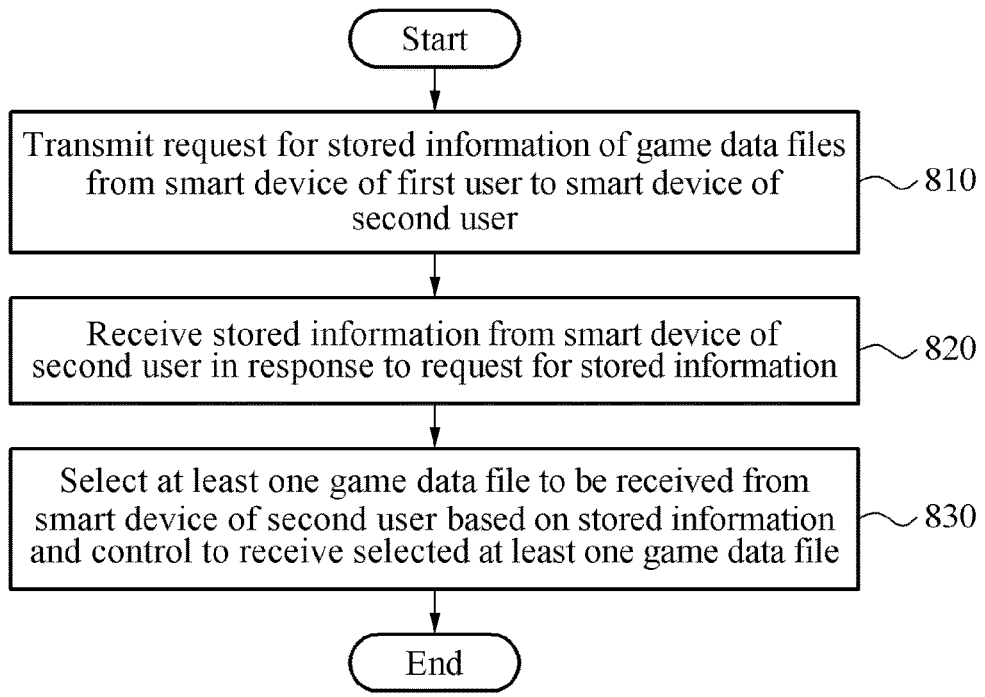
FIG. 8 is a flowchart illustrating a game data file transmitting method according to an embodiment.

FIG. 8 is a flowchart illustrating a game data file transmitting method according to an embodiment.

A method of transmitting game data files from a smart device of a second user to a smart device of a first user through a short-range wireless communication network may transmit a request for stored information of the game data files from the smart device of the first user to the smart device of the second user, in operation 810. The smart device of the first user desiring to receive the game data files may search for and sense the smart device of the second user from which the game data files are to be received through the device and request stored information of receivable game data files. The stored information may include a list of the game data files installed on the smart device of the second user, and the smart device of the second user to transmit the game data files may generate the list of the game data files and transmit the generated list to the smart device of the first user. In operation 820, the stored information may be received from the smart device of the second user in response to the request for the stored information. When the stored information is received, one or more game data files to be received from the smart device of the second user may be selected based on the stored information and the transceiver may be controlled to receive the selected one or more game data files, in operation 830. In this example, the game data files may include an executable file and at least one of one or more resource files. The executable file may be mapped to the one or more resource files. A resource file or an executable file required by the smart device of the first user may be selected, and the executable file may be received or the one or more resource files mapped to the executable file may be received together. An example of mapping one or more resource files and at least one executable file will be described in detail below.

A version of the executable file may be mapped to the one or more resource files according to a game scenario. Although it is desired to receive a predetermined resource file from the smart device of the second user, it may be impossible to execute a game scenario with respect to the resource file if the smart device of the first user does not have an executable file with respect to the predetermined resource file (mapped to the predetermined resource file). From this, it may be learned that each executable file may be mapped to one or more resource files, and the processor may select the at least one game data file by comparing the stored information with an executable file or at least one of the resource files installed on the smart device of the first user. In the game data file transmitting method, the operation of receiving the game data files may include an operation of selecting a resource file stored in the smart device of the second user by comparing the stored information related to the game data of the smart device of the second user with resource files installed on the smart device of the first user, and an operation of determining whether an executable file mapped to the selected resource file is stored in the smart device of the first user and additionally selecting the executable file mapped to the selected resource file based on a result of the determining. In an example in which all of a preceding bundle and an executable file mapped to a resource file to be received are installed, the method may select and receive only the corresponding resource file. Further, in response to determination that the preceding bundle or the executable file mapped to the corresponding resource file is not stored in the smart device of the first user, all of the preceding bundle and the executable file mapped to the corresponding resource file as well as the corresponding resource file may be received from the smart device of the second user.

In the game data file transmitting method, the operation of receiving the game data files may include an operation of comparing the stored information with an executable file installed on the smart device of the first user, and an operation of selecting an executable file stored in the smart device of the second user and additionally selecting a resource file mapped to the selected executable file. That is, contrary to the above case, in an example in which it is desired to receive an executable file of a higher version, one or more resource files mapped to the corresponding executable file may also be received together such that game scenarios playable with the corresponding executable file may be played together. In this example, there may be no need to unconditionally receive all the one or more resource files mapped to the executable file. Selective downloading may be possible, and thus a user convenience may be promoted.

The game data file transmitting method may include an operation of specifying the game scenario for each event or stage flow in the game being played. That is, the user may play the game by randomly or selectively receiving a resource file corresponding to a game scenario associated with a predetermined event or a game scenario provided for each stage as the game is played after the user enters the game. The smart device of the first user may receive only a resource file corresponding to a desired game scenario through the information for each game scenario.

The stored information received from the smart device of the second user may include version information of the game data files, and the game data transmitting method may further include an operation of receiving latest version information related to the game data files from a game server. As described above, the stored information may include version information of the game data files and overall information related to the game data files, in addition to information simply indicating whether the game data files are stored in the smart device of the first and second users. The smart device of the first user may receive latest version information related to the game data files from the game server, and the latest version information may be helpful to verify whether game data stored information of the smart device of the second user is latest information. Even after the game data files are received from the smart device of the second user, the latest version information may be utilized usefully to verify whether reception of an additional game data file is needed.

According to the method, the latest version information may be compared with version information included in the stored information and whether to receive the game data files may be determined based on a result of the comparing. In an example in which the versions of the game data files are lower than the version of the latest version information, the game data file transmitting method may include an operation of determining whether to receive the game data files in view of a game scenario determined based on the versions of the game data files. Further, the method may operate to transmit and receive game data files between users on a portion of a game application program and help with transmission and reception of game data files between users on a separate application program downloaded from a market. A further detailed description of the method is the same as described with respect to the game data file transmitting device and thus, will be omitted for conciseness.

The embodiments described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

The invention claimed is:

1. A device for transmitting game data files between a plurality of smart devices through a short-range wireless communication network, the device provided and operated in a smart device of a first user, the device comprising:

a transceiver configured to transmit a request for stored information of the game data files from the smart device of the first user to a smart device of a second user in possession of resource files constituting the game data files among the plurality of smart devices, and receive the stored information from the smart device of the second user in response to the request for the stored information; and a processor configured to compare the stored information with an executable file or at least one of resource files installed on the smart device of the first user, select at least one game data file of which version information stored in the smart device of the second user is higher than version information stored in the smart device of the first user based on a result of the comparing, and control the transceiver to receive the selected at least one game data file from the smart device of the second user to the smart device of the first user.

2. The device of claim 1, wherein the processor is configured to determine whether to receive the resource files from the smart device of the second user in view of a game scenario to play, if the version information stored in the smart device of the second user is not of a latest version distributed by a game server.

3. The device of claim 1, wherein the transceiver is configured to receive a list of the resource files possessed by the smart device of the second user, the list including a checkbox for an update to the version information stored in the smart device of the second user.

4. The device of claim 3, wherein the transceiver is configured to receive the list including a checkbox for an installation of a resource file possessed by the smart device of the second user if the resource file is not installed on the smart device of the first user.

5. The device of claim 1, wherein the transceiver is configured to receive a list prepared by selecting resource files executable in a version of an executable file installed on the smart device of the first user, among the resource files possessed by the smart device of the second user.

6. The device of claim 1, wherein the transceiver is configured to receive, from the smart device of the second user, a list of executable files constituting the game data files and mapped to the resource files, the list including an update button to be activated if an executable file is installed on the smart device of the first user and an installation button to be activated if the executable file is not installed on the smart device of the first user.

7. The device of claim 2, wherein the game scenario is associated with at least one of a game story and a game event.

8. The device of claim 1, wherein the processor is configured to select a resource file or an executable file stored in the smart device of the second user by comparing the stored information with the resource files installed on the smart device of the first user or executable files mapped to the resource files, and additionally select the selected resource file or executable file.

9. A non-transitory computer-readable recording medium for recording an application program for transmitting game data files between a plurality of smart devices through a short-range wireless communication network, wherein the application program is stored in a memory of a smart device of a first user and executed by a processor of the smart device of the first user, wherein the application program is configured to perform: transmitting a request for stored information of the game data files from the smart device of the first user to a smart device of a second user in possession of resource files constituting the game data files among the plurality of smart devices, and receiving the stored information from the smart device of the second user in response to the request for the stored information;

comparing the stored information with an executable file or at least one of resource files installed on the smart device of the first user;

selecting at least one game data file of which version information stored in the smart device of the second user is higher than version information stored in the smart device of the first user based on a result of the comparing; and receiving the selected at least one game data file from the smart device of the second user to the smart device of the first user, wherein the game data files include an executable file and at least one resource file, the executable file is mapped to the at least one resource file according to a game scenario, and the stored information includes a list of the game data files installed on the smart device of the second user.

10. The non-transitory computer-readable recording medium of claim 9, wherein the application program is further configured to perform determining whether to receive the resource files from the smart device of the second user in view of a game scenario to play, if the version information stored in the smart device of the second user is not of a latest version distributed by a game server.

11. The non-transitory computer-readable recording medium of claim 9, wherein the application program is further configured to perform receiving a list of the resource files possessed by the smart device of the second user, the list including a checkbox for an update to the version information stored in the smart device of the second user.

12. The non-transitory computer-readable recording medium of claim 9, wherein the application program is further configured to perform:
outputting a list of the at least one game data file to be received and information of the game data file on a display of the smart device of the first user; and
outputting a storage space of the smart device of the first user through the display when the information of the game data file is associated with a data size.

13. The non-transitory computer-readable recording medium of claim 9, wherein the application program is further configured to perform receiving, from the smart device of the second user, a list prepared by selecting resource files executable in a version of an executable file installed on the smart device of the first user, among the resource files possessed by the smart device of the second user.

14. The non-transitory computer-readable recording medium of claim 9, wherein the application program is further configured to perform receiving, from the smart device of the second user, a list of executable files constituting the game data files and mapped to the resource files, the list including an update button to be activated if an executable file is installed on the smart device of the first user and an installation button to be activated if the executable file is not installed on the smart device of the first user.

15. A method of transmitting game data files between a plurality of smart devices through a short-range wireless communication network, the method comprising:
transmitting a request for stored information of the game data files from a smart device of a first user to a smart device of a second user in possession of resource files constituting the game data files among the plurality of smart devices;
receiving the stored information from the smart device of the second user in response to the request for the stored information;
comparing the stored information with an executable file or at least one of resource files installed on the smart device of the first user;
selecting at least one game data file of which version information stored in the smart device of the second user is higher than version information stored in the smart device of the first user based on a result of the comparing; and
receiving the selected at least one game data file from the smart device of the second user to the smart device of the first user,
wherein the game data files include an executable file and at least one resource file, the executable file is mapped to the at least one resource file according to a game scenario, and the stored information includes a list of the game data files installed on the smart device of the second user.

16. The method of claim 15, further comprising:
determining whether to receive the resource files from the smart device of the second user in view of a game scenario to play, if the version information stored in the smart device of the second user is not of a latest version distributed by a game server.

17. The method of claim 15, further comprising:
receiving, from the smart device of the second user, a list of the resource files possessed by the smart device of the second user, the list including a checkbox for an update to the version information stored in the smart device of the second user.

18. The method of claim 17, further comprising:
receiving the list including a checkbox for an installation of a resource file possessed by the smart device of the second user if the resource file is not installed on the smart device of the first user.

19. The method of claim 15, further comprising:
receiving, from the smart device of the second user, a list prepared by selecting resource files executable in a version of an executable file installed on the smart device of the first user, among the resource files possessed by the smart device of the second user.

20. The method of claim 15, further comprising:
receiving, from the smart device of the second user, a list of executable files constituting the game data files and mapped to the resource files, the list including an update button to be activated if an executable file is installed on the smart device of the first user and an installation button to be activated if the executable file is not installed on the smart device of the first user.

* * * * *